United States Patent [19]

Ooka et al.

[11] Patent Number: 4,634,736

[45] Date of Patent: Jan. 6, 1987

[54] PROCESS FOR PRODUCING TERTIARY AMINO GROUP-CONTAINING VINYL POLYMERS AND CURABLE RESIN COMPOSITIONS BASED ON THESE POLYMERS

[76] Inventors: Masataka Ooka, 6-11-4, Tomigaoka, Nara-shi, Nara-ken; Shinichi Kuwamura, 4-17, Jyonan-cho, Izumi-ohtsu-shi, Osaka-fu; Yoichi Murakami, 920-110, Ohkubo, Kumatori-cho, Sennan-gun, Osaka-fu, all of Japan

[21] Appl. No.: 823,794

[22] Filed: Jan. 29, 1986

Related U.S. Application Data

[62] Division of Ser. No. 708,938, Mar. 6, 1985.

[30] Foreign Application Priority Data

Mar. 8, 1984 [JP] Japan ................................. 59-42827
Mar. 8, 1984 [JP] Japan ................................. 59-42828

[51] Int. Cl.$^4$ ................................................ C08F 8/32
[52] U.S. Cl. ................................. 525/117; 525/327.6; 525/382
[58] Field of Search ...................... 525/117, 327.6, 382

[56] References Cited

U.S. PATENT DOCUMENTS

| | | | |
|---|---|---|---|
| 3,375,300 | 3/1968 | Ropp | 525/117 |
| 3,554,985 | 1/1971 | Fields et al. | 525/327.6 |
| 3,923,752 | 12/1975 | Güse et al. | 525/117 |
| 3,984,382 | 10/1976 | Parekh et al. | 525/327.6 |
| 4,423,194 | 12/1983 | Lobach et al. | 525/327.6 |
| 4,468,497 | 8/1984 | Street et al. | 525/117 |
| 4,522,962 | 6/1985 | Abbey et al. | 525/117 |

Primary Examiner—Joseph L. Schofer
Assistant Examiner—Bernard Lipman
Attorney, Agent, or Firm—Sherman & Shalloway

[57] ABSTRACT

A process for the production of a vinyl polymer containing a tertiary amino group, which comprises subjecting (a-1) a vinyl polymer containing a carboxylic anhydride group obtained by copolymerizing maleic anhydride, itaconic anhydride or mixtures thereof with at least one copolymerizable monomer and (a-2) a compound containing both one primary amino group and one tertiary amino group for each molecule to a ring-opening reaction, and dehydrocyclizing the adduct to form an imide ring containing polymer. A curable resin composition comprising the resulting polymer and a polyepoxy compound as essential ingredients.

9 Claims, No Drawings

PROCESS FOR PRODUCING TERTIARY AMINO GROUP-CONTAINING VINYL POLYMERS AND CURABLE RESIN COMPOSITIONS BASED ON THESE POLYMERS

This is a division of application Ser. No. 708,938, filed Mar. 6, 1985.

This invention relates to a new and useful process for the production of a vinyl polymer containing a teriary amino group, and to a curable resin composition comprising the resulting vinyl polymer as a base resin component. More specifically, this invention relates to a process for producing a vinyl polymer containing a tertiary amino group, which comprises subjecting a vinyl polymer containing a carboxylic anhydride group obtained by copolymerizing maleic anhydride, itaconic anhydride or mixtures thereof with at least one copolymerizable monomer and a specific compound containing a tertiary amino group to addition a ring-opening reaction, and dehydrocyclizing the adduct to form an imide ring containing polymer, and to a novel and useful curable resin composition comprising this specific vinyl polymer and a polyepoxy compound as main ingredients.

For the production of vinyl polymers containing a tertiary amino group, a method has heretofore been employed which involves (co)polymerization of a (meth)acrylate containing a tertiary amino group such as an N,N-dialkylaminoalkyl (meth)acrylate as one monomer. The polymers obtained by this method, however, have an amine odor and are heavily discolored. Hence, when a mixture of such a polymer and an epoxy resin is coated and cured, the resulting coated film is markedly discolored and shows a debased commercial value.

It is an object of this invention to remove this defect of the prior art.

In order to achieve this object, the present inventors have worked extensively, and finally found that when a vinyl polymer containing a carboxylic anhydride group obtained by copolymerizing maleic anhydride, itaconic anhydride or mixtures thereof with at least one copolymerizable monomer is reacted with a specific compound containing a tertiary amino group, a tertiary amino group-containing vinyl polymer free from an amine odor or discoloration can be obtained, and that a resin composition comprising this tertiary amino group-containing vinyl polymer and a polyepoxy compound gives a cured product free from discoloration and having excellent soiling resistance, alkali resistance and weatherability.

The present invention thus provides a novel and useful process for producing a vinyl polymer containing a tertiary amino group, which comprises subjecting (a-1) a vinyl polymer containing a carboxylic anhydride group obtained by copolymerizing maleic anhydride, itaconic anhydride or mixtures thereof with at least one copolymerizable monomer and (a-2) a compound containing both one primary amino group and one tertiary amino group for each molecule to a ring-opening reaction, and dehydrocyclizing the adduct to form an imide ring containing polymer, and a curable resin composition capable of giving cured products having excellent soiling resistance and alkali resistance, comprising (A) a vinyl polymer containing a tertiary amino group obtained by the aforesaid process and (B) a polyepoxy compound.

The vinyl polymer (a-1) containing a carboxylic anhydride group obtained by copolymerizing maleic anhydride, itaconic anhydride or mixtures thereof with at least one copolymerizable monomer denotes a copolymer obtained by copolymerizing a monomer containing an acid anhydride group such as maleic anhydride or itaconic anhydride and another vinyl monomer copolymerizable with such an anhydride. Typical examples of the other copolymerizable vinyl monomer include (meth)acrylates such as methyl (meth)acrylate, ethyl (meth)acrylate, propyl (meth)acrylate, n-butyl (meth)acrylate, iso-butyl (meth)acrylate, tertbutyl (meth)acrylate, 2-ethylhexyl (meth)acrylate, lauryl (meth)acrylate, stearyl (meth)acrylate, cyclohexyl (meth)acrylate and benzyl (meth)acrylate; dialkyl esters of unsaturated dibasic acids such as itaconic acid, maleic acid and fumaric acid; carboxyl-containing monomers, for example adducts of hydroxyl-containing vinyl monomers such as beta hydroxylethyl(meth)acrylates with acid anhydrides such as succinic anhydride and trimellitic anhydride, (meth)acrylic acid, crotonic acid, itaconic acid, maleic acid, fumaric acid, monoalkyl itaconates, monoalkyl maleates, and monoalkyl fumarates; aromatic unsaturated hydrocarbons such as styrene, alpha-methylstyrene or vinyltoluene; and other various vinyl monomers including vinyl acetate, (meth)acrylonitrile, (meth)acrylamide, diacetoneacrylamide, N,N-dimethyl(meth)acrylamide, N-vinylpyrrolidone, vinyl chloride and a phosphoric acid ester of beta-hydroxyethyl (meth)acrylate.

The suitable amount of the monomer containing an acid anhydride group is 1 to 20% by weight in view of the curability of the resulting polymer and the alkali resistance and soiling resistance of a cured product from the polymer.

The object of this invention can be achieved even without particularly using the aforesaid carboxyl-containing monomers. If it is necessary to shorten the reaction time, the carboxyl-containing monomer is preferably copolymerized in an amount of 0.1 to 15% by weight.

The polymer (a-1) may be prepared from the above-exemplified monomers by any known conventional methods, preferably by a solution radical polymerization method. This polymerization may be carried out in solution in a usual manner by using known azo-type or peroxide-type polymerization initiators. Examples of suitable solvents for use in this polymerization process are aromatic hydrocarbons such as toluene and xylene, (cyclo) aliphatic hydrocarbons such as hexane, pentane and cyclohexane, esters such as ethyl acetate, butyl acetate and ethylene glycol monomethyl ether acetate and ketones such as acetone, methyl ethyl ketone, methyl isobutyl ketone and cyclohexanone.

In the polymerization, a chain transfer agent may also be used. Examples include mercaptans (such as tert-dodecylmercaptan, laurylmercaptan, alkyl thioglycollates and beta-mercaptopropionic acid), and alpha-methylstyrene dimer.

Typical examples of the compound (a-2) containing both one primary amino group and one tertiary amino group for each molecule include N,N-dialkylethylenediamines such as N,N-dimethylethylenediamine, N,N-diethylethylenediamine and N,N-dipropylethylenediamine; N,N-dialkyl-1,3-propylenediamines such as N,N-dimethyl-1,3-propylenediamine, N,N-diethyl-1,3-propylenediamine and N,N-dipropyl-1,3-propylenediamine; N,N-dialkyl-1,4-tetramethylenediamines such as N,N-dimethyl-1,4-tetramethylenediamine and N,N-diethyl-1,4-tetramethylenediamine; N,N-dialkyl-1,6-hexamethylenediamines such as N,N-dimethyl-1,6-hexamethylenediamine and N,N-diethyl-1,6-hexamethylenediamine; N-aminoalklylmorpholines such as N-(2-aminoethyl)morpholine, N-(3-aminopropyl)morpholine, N-(4-aminobutyl)morpholine and N-(6-aminohexyl)morpholine; N-aminoalkylpyrrolidines such as N-(2-aminoethyl)pyrrolidine and N-(3-aminopropyl)pyrrolidine; and N-aminoalkylpiperidines such as N-(2-aminoethyl)piperidine and N-(3-aminopropyl)piperidine. Of these, the N,N-dialkyl-1,3-propylenediamines are preferred in view of economy and the curability of the composition of this invention.

In performing the process of this invention, at first, the components (a-1) and (a-2) are mixed so that the amount of the primary amino groups in the compound (a-2) becomes about 0.5 to 3 molar equivalents per equivalent of the acid anhydride groups in the polymer (a-1). The mixture is then stirred at room temperature to about 120° C. for a period of about 0.5 to 3 hours. The resulting adduct is then heated at 70° to 150° C. for about 1 to 20 hours to dehydrocyclize it to form an imide ring containing polymer. As a result, the desired vinyl polymer containing a tertiary amino group and an imide ring is obtained.

As one example, the reaction of a maleic anhydride copolymer as the polymer (a-1) with N,N-dimethylamino-1,3-propylenediamine as the compound (a-2) is schematically shown below.

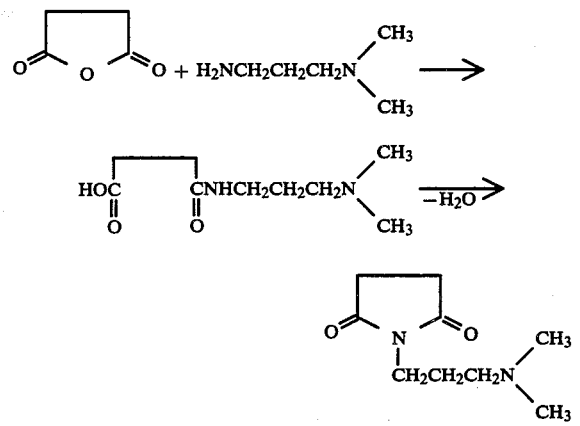

As shown above, in the production of the desired vinyl polymer in accordance with the process of this invention, water of condensation is formed. For some uses, the final polymer may be used as such without removing the water of condensation. If the removal of the water of condensation is desired, it can be accomplished, for example, by adding a conventional desiccant or dehydrating agent, or azeotroping it with a solvent during or after the dehydrocyclization reaction.

A curable resin composition obtained by blending a polyepoxy compound (B) as a curing agent with the tertiary amino group-containing vinyl polymer (A) produced by the process of this invention may be used as a paint, a sealing agent, an adhesive, etc.

Typical examples of the polyepoxy compound (B) include polyglycidyl ethers of polyhydric alcohols such as ethylene glycol diglycidyl ether, 1,6-hexanediol diglycidyl ether, neopentyl glycol diglycidyl ether, glycerin polyglycidyl ether, pentaerythritol polyglycidyl ether, sorbitol polyglycidyl ether and a diglycidyl ether of hydrogenated bisphenol A; polyglycidyl ethers of compounds containing phenolic hydroxyl groups, such as a bisphenol A diglycidyl ether-type epoxy resin, a bisphenol F diglycidyl ether-type epoxy resin, and a polyglycidyl ether-type epoxy resin from a novolak-type phenolic resin; polyglycidyl esters of polycarboxylic acids such as diglycidyl adipate, diglycidyl phthalate and diglycidyl isophthalate; N-glycidyl polyamines such as N,N,N',N'-tetraglycidyl m-xylylenediamine and 1,3-bis-(N,N-diglycidylaminomethyl)cyclohexane; epoxy resins containing a hydantoin ring; glycidyl ester ethers of p-hydroxybenzoic acid; and various vinyl polymers having a (beta-methyl)glycidyl group in the side chains. These polyepoxy compounds may be used singly or in combination.

The blending ratio between the vinyl polymer (A) and the polyepoxy compound (B), in view of the curability of the resulting composition, is preferably such that the amount of the epoxy groups in the compound (B) is 0.5 to 2 equivalents per equivalent of the sum of the tertiary amino groups and the carboxyl groups and/or the unreacted acid anhydride groups in the polymer (A).

When an epoxy resin having good weatherability such as a polyglycidyl ether of a polyhydric alcohol is used as the polyepoxy compound (B) in preparing the composition of this invention, there can be obtained a resin composition capable of giving a cured product having good weatherability. An ultraviolet absorber, an antioxidant, etc. may further be incorporated in the resin composition to increase its weatherability further.

Typical ultraviolet absorbers include benzotriazole compounds, hydroxybenzophenone compounds and unsaturated nitrile compounds. Typical antioxidants include hindered phenolic compounds and hindered amine compounds. The suitable amounts of the ultraviolet absorbers and/or antioxidants to be added are about 0.05 to 5% by weight based on the total solids of the components (A) and (B).

The curable resin composition of this invention so obtained can be used as a paint either directly or as required, after further incorporating a pigment, a solvent or another synthetic resin such as cellulose acetate butyrate, nitrocellulose, chlorinated polyolefins, blocked polyisocyanates, and ketone resins.

The paint obtained from the composition of this invention can give a cured coated film having excellent properties including soiling resistance and alkali resistance usually by coating it on a substrate and then leaving it to stand at room temperature for 1 to 2 days or as required, drying it at 60° to 100° C. for 20 to 40 minutes, whereby the coated film is fully cured.

When the composition of the invention is used as a clear paint, the coloration of a coated film from it is little, and it is free from toxicity which frequently causes troubles in using urethane paints.

The composition of this invention can be effectively used to various applications in which urethane paints have heretofore been used, for example as automotive repair paints, or paints for wood works, building materials and plastics. It can also be used as an adhesive or a sealing agent.

The following Examples and Comparative Examples illustrate the present invention more specifcially. Unless otherwise specified, all parts and percentages are by weight.

EXAMPLE 1

A reactor equipped with a thermometer, a stirrer, a dropping funnel, a nitrogen introducing tube and a condenser was charged with 700 parts of toluene, and heated to 110° C. in an atmosphere of nitrogen. A mixture composed of 300 parts of styrene, 200 parts of methyl methacrylate, 300 parts of n-butyl methacrylate, 130 parts of n-butyl acrylate, 70 parts of maleic anhydride, 10 parts of azobisisobutyronitrile (AIBN), 10 parts of tert-butyl peroxyoctoate (TBPO), 5 parts of tert-butyl peroxybenzoate (TBPB) and 300 parts of toluene was added dropwise to the reactor over the course of 3 hours. The reaction mixture was then maintained at this temperature for 15 hours. There was obtained a solution of a vinyl polymer (a-1) containing an acid anhydride group and having a nonvolatile content (NV) of 50% and a number average molecular weight ($\overline{Mn}$) of 9,000. It will be abbreviated as vinyl polymer (a-1-1) hereinafter.

The temperature of the polymer solution was then lowered to 100° C., and 72.9 parts of N,N-dimethyl-1,3-propylenediamine was added. The mixture was kept at this temperature for 12 hours to perform dehydrocyclization. Under reduced pressure, 100 parts of toluene was distilled off to remove the water of condensation.

Thereafter, 100 parts of toluene and 296 parts of n-butanol was added to form a solution of the desired vinyl polymer having a Gardner color of less than 1 and an NV of 45%. It will be abbreviated as vinyl polymer (A-1).

The solids of the resulting polymer (A-1) had an acid value of 4.0. An IR spectrum of the solids showed an absorption at about 1700 cm$^{-1}$ assigned to the imide ring. The ratio of conversion of the amide group into the imide group calculated from the acid value was 89%.

EXAMPLE 2

A vinyl polymer (a-1) containing an acid anhydride group having an NV of 50% and an $\overline{Mn}$ of 9,100 was prepared in the same way as in Example 1 except that the amount of maleic anhydride was changed to 50 parts and 20 parts of acrylic acid was additionally used. It will be abbreviated as vinyl polymer (a-1-2) hereinafter.

The temperature of the polymer solution was then lowered to 100° C., and 52 parts of N,N-dimethyl-1,3-propylenediamine was added. The mixture was maintained at this temperature for 3 hours to perform dehydrocyclization. Under reduced pressure, 100 parts of toluene was distilled off to remove the water of condensation.

Thereafter, 100 parts of toluene and 275 parts of n-butanol were added to give a solution of the desired vinyl polymer having a Gardner color of less than 1 and an NV of 45%. This polymer will be abbreviated as vinyl polymer (A-2) hereinafter. The solids of the polymer (A-2) has an acid value of 16.3. The conversion of the amide group to the imide ring calculated from the acid value was 94%.

EXAMPLE 3

A solution of a vinyl polymer (a-1) containing an acid anhydride group having an NV of 50% and an $\overline{Mn}$ of 9,200 was prepared in the same way as in Example 1 except that the monomers to be copolymerized were changed to 200 parts of styrene, 300 parts of methyl methacrylate, 300 parts of n-butyl methacrylate, 120 parts of n-butyl acrylate, 40 parts of methacrylic acid and 40 parts of meleic anhydride. The polymer will be abbreviated as vinyl polymer (a-1-3) hereinafter.

The temperature of resulting polymer solution was lowered to 100° C., and 41.6 parts of N,N-dimethyl-1,3-propylenediamine was added. The mixture was maintained at this temperature for 3 hours to perform dehydrocyclization. Then, under reduced pressure 100 parts of toluene was distilled off to remove the water of condensation.

Then, 100 parts of toluene and 264 parts of n-butanol were added to give a solution of the desired vinyl polymer having a Gardner color of less than 1 and an NV of 45%. It will be abbreviated as vinyl polymer (A-3). The solids of the polymer (A-3) had an acid value of 26. The conversion of the amide group into the imide ring calculated from the acid value was 96%.

EXAMPLE 4

Two thousand parts of the polymer (a-1-2) obtained in Example 2 was heated to 100° C., and 66.3 parts of N,N-diethyl-1,3-propylenediamine was added. The mixture was maintained at this temperature for 3 hours to perform dehydrocyclization. Then, under reduced pressure, 100 parts of toluene was distilled off to remove the water of condensation.

Then, 100 parts of toluene and 292 parts of n-butanol were added to form a solution of the desired vinyl polymer having a Gardner color of less than 1 and an NV of 45%. It will be abbreviated as vinyl polymer (A-4) hereinafter. The solids of the polymer (A-4) had an acid value of 16. The conversion of the amide group into the imide ring calculated from the acid value was 95%.

COMPARATIVE EXAMPLE 1

Two thousand parts of the polymer (a-1-1) obtained in Example 1 was heated to 50° C., and 72.9 parts of N,N-dimethyl-1,3-propylenediamine was added. The mixture was maintained at this temperature for 30 minutes, and then 311 parts of n-butanol was added to give a solution of a tertiary amino group-containing vinyl polymer having a Gardner color of less than 1 and an NV of 45% without any formation of an imide ring. It will be abbreviated as vinyl polymer (A'-1) hereinafter. The solids of this polymer had an acid value of 37.

EXAMPLES 5-8 AND COMPARATIVE EXAMPLE 2

In each run, a white paint having a PWC of 40% was prepared in accordance with each of the formulations indicated in the following table using each of the polymer solutions obtained in Examples 1 to 4 and Comparative Example 1 as a base resin component. Then, paint was diluted to a sprayable viscosity with a mixed solvent composed of xylene, toluene, n-butanol and Cellosolve acetate in a weight ratio of 30:40:20:10, and spray-coated on a slate board, followed by drying and curing at room temperature for 7 days.

The cured coated film was evaluated as follows, and the results shown in the following table were obtained.

|  |  | Example 5 | Example 6 | Example 7 | Example 8 | Comparative Example 2 |
|---|---|---|---|---|---|---|
| Formulation (parts) | Polymer (A-1) solution | 100 |  |  |  |  |
|  | Polymer (A-2) solution |  | 100 |  |  |  |
|  | Polymer (A-3) solution |  |  | 100 |  |  |
|  | Polymer (A-4) solution |  |  |  | 100 |  |
|  | Polymer (A'-1) solution |  |  |  |  | 100 |
|  | Diglycerin polyglycidyl ether (epoxyequivalent = 155) | 5.1 |  | 6.0 |  | 9.2 |
|  | Sorbitol polyglycidyl ether (epoxyequivalent = 170) |  | 5.9 |  | 5.8 |  |
|  | rutile-type titanium dioxide (*1) | 33.4 | 33.9 | 34.0 | 38.9 | 36.1 |
|  | Ultraviolet absorber (*2) | 0.15 | 0.15 |  |  | 0.15 |
|  | Antioxidant (*3) | 0.15 |  |  |  | 0.15 |
|  | Antioxidant (*4) |  | 0.15 |  |  |  |
| Properties of the coated film | Alkali resistance (*5) | | No change | | | Loss of gloss |
|  | Soiling resistance (*6) | | Good | | | Poor |
|  | Accelerated weatherability (gloss retention %) (*7) | 92 | 90 | 80 | 83 | 70 |

Note to the above table
(*1) rutile-type titanium dioxide made by Ishihara Sangyo Kaisha, Ltd., Japan.
(*2) a benzotriazole-type ultraviolet absorber made by Ciba-Geigy, Ltd., Switzerland.
(*3) a hindered phenol-type antioxidant made by Ciba-Geigy, Ltd., Switzerland.
(*4) a hindered amine-type antioxidant made by Sankyo Co., Ltd., Japan.
(*5) The coated film was immersed for one month in a saturated aqueous solution of calcium hydroxide at room temperature, and a change in its appearance was evaluated visually.
(*6) The coated film was painted by a red felt pen, and left to stand at room temperature for 1 day. Then, the coated film was wiped with a mixed solvent composed of petroleum benzine and ethanol in a weight ratio of 50:50, and the state of contamination of the coated film was visually evaluated.
(*7) The test was performed by a Q-UV accelerated weathering tester made by The Q-Panel Company, one cycle, UV irradiation (8 hours at 70° C.) and condensation (4 hours, 50° C.). The test was conducted for 1000 hours, and then the gloss value of the coated film was measured and divided by its initial gloss value. The quotient was multiplied by 100 to obtain gloss retention (%).

The results given in the above table show that the curable resin compositions of this invention give cured products (cured coated films) having excellent alkali resistance, soiling resistance and weatherability.

What is claimed is:

1. A curable resin composition comprising as essential ingredients
   (A) a vinyl polymer containing a tertiary amino group obtained by subjecting (a-1) a vinyl polymer containing a carboxylic anhydride group obtained by copolymerizing maleic anhydride, itaconic anhydride or mixtures thereof with at least one copolymerizable monomer and (a-2) a compound containing one primary amino group and one tertiary amino group for each molecule to a ring-opening reaction, and thereafter dehydrocyclizing the resulting adduct to form an imide ring containing polymer, and
   (B) a polyepoxy compound.

2. The composition of claim 1 wherein the compound (a-1) also contains a carboxyl group.

3. The composition of claim 1 wherein the compound (a-2) is an N,N-dialkyl-1,3-propylenediamine.

4. The composition of claim 1 which further comprises an ultraviolet absorber.

5. The composition of claim 1 which further comprises an antioxidant.

6. The composition of claim 1 which further comprises an ultraviolet absorber and an antioxidant.

7. The composition of claim 1 wherein the vinyl polymer (a-1) is a copolymer of said acid anhydride with a copolymerizable vinyl monomer selected from the group consisting of methyl (meth)acrylate, ethyl (meth)acrylate, propyl (meth)acrylate, n-butyl (meth)acrylate, iso-butyl (meth)acrylate, tert-butyl (meth)acrylate, 2-ethylhexyl (meth)acrylate, lauryl (meth)acrylate, stearyl (meth)acrylate, cyclohexyl (meth)acrylate, benzyl (meth)acrylate, itaconic acid, maleic acid, fumaric acid, adducts of beta-hydroxyl ethyl (meth)acrylate with succinic anhydride or trimellitic anhydride, (meth)acrylic acid, crotonic acid, itaconic acid, maleic acid, fumaric acid, monoalkyl itaconates, monoalkyl maleates, monoalkyl fumarates, styrene, alpha-methylstyrene, vinyltoluene, vinyl acetate, (meth)acrylonitrile, (meth)acrylamide, diacetoneacrylamide, N,N-dimethyl(meth)acrylamide, N-vinylpyrrolidone, vinyl chloride and a phosphoric acid ester of beta-hydroxyethyl (meth)acrylate.

8. The composition of claim 1 wherein the compound (a-2) is selected from the group consisting of N,N-dimethylethylenediamine, N,N-diethylenthylenediamine, N,N-dipropylethylenediamine, N,N-dimethyl-1,3-propylenediamine, N,N-diethyl-1,3-propylene diamine, N,N-dipropyl-1,3-propylenediamine, N,N-dimethyl-1,4-tetramethylenediamine, N,N-diethyl-1,4-tetramethylenediamine, N,N-dimethyl-1,6-hexamethylenediamine, N,N-diethyl-1,6-hexamethylenediamine, N-(2-aminoethyl)morpholine, N-(3-aminopropyl)morpholine, N-(4-aminobutyl)morpholine, N-(6-aminohexyl)morpholine, N-(2-aminoethyl)pyrrolidine, N-(3-aminopropyl)pyrrolidine, N-(2-aminoethyl)piperidine, and N-(3-aminopropyl)piperidene.

9. The composition of claim 1 wherein the components (a-1) and (a-2) are mixed so that the amount of the primary amino groups in the compound (a-2) is about 0.5 to 3 molar equivalents per equivalent of the acid anhydride groups in the polymer (a-1).

* * * * *

UNITED STATES PATENT AND TRADEMARK OFFICE
CERTIFICATE OF CORRECTION

PATENT NO. : 4,634,736

DATED : January 6, 1987

INVENTOR(S) : MASATAKA OOKA, ET AL.

It is certified that error appears in the above-identified patent and that said Letters Patent is hereby corrected as shown below:

ON THE TITLE PAGE

Add the following information

[73] Assignee: Dainippon Ink and Chemicals, Inc., Tokyo, Japan

Signed and Sealed this

Seventh Day of April, 1987

Attest:

Attesting Officer

DONALD J. QUIGG

Commissioner of Patents and Trademarks